US009548063B2

(12) United States Patent
Shi et al.

(10) Patent No.: US 9,548,063 B2
(45) Date of Patent: Jan. 17, 2017

(54) METHOD AND APPARATUS FOR ACOUSTIC ECHO CONTROL

(71) Applicant: DOLBY LABORATORIES LICENSING CORPORATION, San Francisco, CA (US)

(72) Inventors: Dong Shi, Shanghai (CN); JiaQuan Huo, Hurtsville Grove (AU); Xuejing Sun, Beijing (CN); Glenn N. Dickins, Como (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 143 days.

(21) Appl. No.: 14/382,864

(22) PCT Filed: Mar. 21, 2013

(86) PCT No.: PCT/US2013/033225
§ 371 (c)(1),
(2) Date: Sep. 4, 2014

(87) PCT Pub. No.: WO2013/142647
PCT Pub. Date: Sep. 26, 2013

(65) Prior Publication Data

US 2015/0023514 A1 Jan. 22, 2015

Related U.S. Application Data

(60) Provisional application No. 61/619,270, filed on Apr. 2, 2012.

(30) Foreign Application Priority Data

Mar. 23, 2012 (CN) .......................... 2012 1 0080810

(51) Int. Cl.
*H04B 3/20* (2006.01)
*G10L 21/0208* (2013.01)
(Continued)

(52) U.S. Cl.
CPC ........... *G10L 21/0208* (2013.01); *G10L 21/02* (2013.01); *G10L 25/12* (2013.01); *G10L 2021/02082* (2013.01)

(58) Field of Classification Search
CPC ........... G10L 2021/02082; G10L 21/02; G10L 21/0208; G10L 25/12
See application file for complete search history.

(56) References Cited

U.S. PATENT DOCUMENTS

| | | | |
|---|---|---|---|
| 6,775,653 | B1 | 8/2004 | Wei |
| 7,742,592 | B2 | 6/2010 | Faller |

(Continued)

FOREIGN PATENT DOCUMENTS

| | | |
|---|---|---|
| WO | 2011/133075 | 10/2011 |

OTHER PUBLICATIONS

Cho, Jun H. et al "An Objective Technique for Evaluating Doubletalk Detectors in Acoustic Echo Cancelers" IEEE Transactions on Speech and Audio Processing, vol. 7, No. 6, Nov. 1, 1999.

*Primary Examiner* — Regina N. Holder

(57) ABSTRACT

Embodiments of method and apparatus for acoustic echo control are described. According to the method, an echo energy-based doubletalk detection is performed to determine whether there is a doubletalk in a microphone signal with reference to a loudspeaker signal. A spectral similarity between spectra of the microphone signal and the loudspeaker signal is calculated. It is determined that there is no doubletalk in the microphone signal if the spectral similarity is higher than a threshold level. Adaption of an adaptive filter for applying acoustic echo cancellation or acoustic echo suppression on the microphone signal is enabled if it is determined that there is no doubletalk in the microphone (Continued)

signal through the echo energy-based doubletalk detection, or there is no doubletalk through the spectral similarity-based doubletalk detection.

8 Claims, 8 Drawing Sheets

(51) Int. Cl.
*G10L 21/02* (2013.01)
*G10L 25/12* (2013.01)

(56) References Cited

U.S. PATENT DOCUMENTS

| | | | | |
|---|---|---|---|---|
| 7,852,792 | B2 | 12/2010 | Cao | |
| 8,036,879 | B2 | 10/2011 | Hetherington | |
| 2002/0041678 | A1 | 4/2002 | Basburg-Ertem | |
| 2007/0160154 | A1* | 7/2007 | Sukkar | G10L 19/012 375/242 |
| 2007/0263851 | A1 | 11/2007 | Sukkar | |
| 2008/0107281 | A1 | 5/2008 | Togami | |
| 2008/0181420 | A1 | 7/2008 | Mohammad | |
| 2009/0010445 | A1 | 1/2009 | Matsuo | |
| 2009/0252343 | A1 | 10/2009 | Mao | |
| 2010/0054454 | A1 | 3/2010 | Cao | |
| 2010/0074432 | A1 | 3/2010 | Adeney | |
| 2011/0019833 | A1 | 1/2011 | Kuech | |
| 2011/0044461 | A1 | 2/2011 | Kuech | |

* cited by examiner

METHOD AND APPARATUS FOR ACOUSTIC ECHO CONTROL

CROSS-REFERENCE TO RELATED APPLICATIONS

This application claims priority to U.S. Provisional Priority Patent Application No. 61/619,270 filed 2 Apr. 2012 and Chinese Priority Patent Application No. 201210080810.3 filed 23 Mar. 2012, which is hereby incorporated by reference in its entirety.

TECHNICAL FIELD

The present invention relates generally to audio signal processing. More specifically, embodiments of the present invention relate to acoustic echo control.

BACKGROUND

Acoustic echo control involves cancelling or suppressing undesired echo signals that result from acoustic coupling between a loudspeaker and a microphone. Acoustic echo cancellation (AEC) or acoustic echo suppression (AES) may be used for this purpose.

AEC is a method where echo cancellation is accomplished by adaptively identifying the echo path impulse response and subtracting an estimate of the echo signal from the microphone signal. AES is a method where spectrum of the echo signal contained in a microphone signal is estimated, and the echo suppression is achieved by spectrum modification.

To estimate the echo signal, coefficients of an adaptive filter are adaptively updated to identify the echo path response. However, in the case that a doubletalk detector (DTD) detects a doubletalk (when a talker at the near-end of the microphone is talking in the presence of echo), usually the adaption of the adaptive filter is disabled to prevent that the near-end signal has a negative effect on the adaptive filter in terms of estimating the acoustic echo path.

SUMMARY

According to an embodiment of the invention, a method of performing acoustic echo control is provided. According to the method, an echo energy-based doubletalk detection is performed to determine whether there is a doubletalk in a microphone signal with reference to a loudspeaker signal. A spectral similarity between spectra of the microphone signal and the loudspeaker signal is calculated. It is determined that there is no doubletalk in the microphone signal if the spectral similarity is higher than a threshold level. Adaption of an adaptive filter for applying acoustic echo cancellation or acoustic echo suppression on the microphone signal is enabled if it is determined that there is no doubletalk in the microphone signal through the echo energy-based doubletalk detection, or there is no doubletalk through the spectral similarity-based doubletalk detection.

According to an embodiment of the invention, an apparatus for performing acoustic echo control is provided. The apparatus includes a first doubletalk detector, a second doubletalk detector, an echo processing unit and a controller. The first doubletalk detector performs an echo energy-based doubletalk detection to determine whether there is a doubletalk in a microphone signal with reference to a loudspeaker signal. The second doubletalk detector calculates a spectral similarity between spectra of the microphone signal and the loudspeaker signal, and determine that there is no doubletalk in the microphone signal if the spectral similarity is higher than a threshold level. The echo processing unit performs adaption of an adaptive filter for applying acoustic echo cancellation or acoustic echo suppression on the microphone signal. The controller enables the adaption of the adaptive filter if it is determined that there is no doubletalk in the microphone signal through the echo energy-based doubletalk detection, or there is no doubletalk through the spectral similarity-based doubletalk detection.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
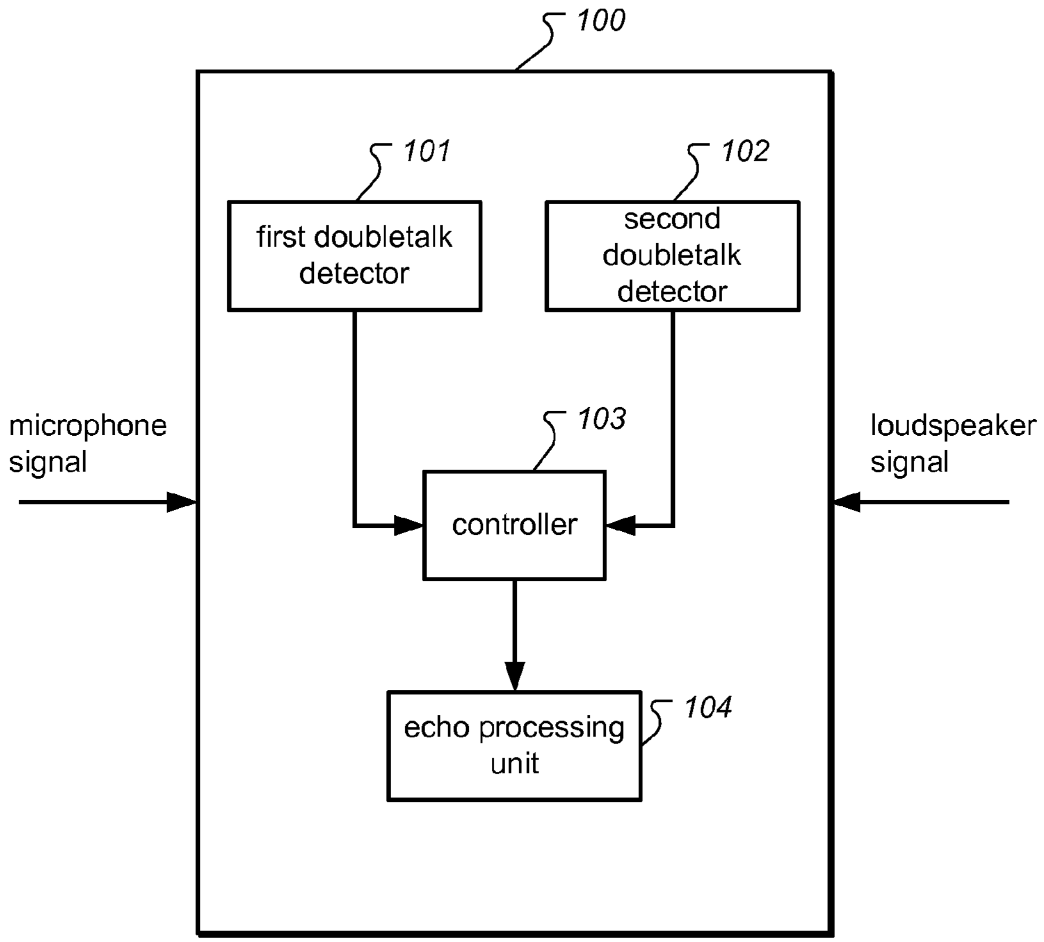
FIG. 1 is a block diagram illustrating an example apparatus for performing acoustic echo control according to an embodiment of the invention.

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system, a device (e.g., a cellular telephone, portable media player, personal computer, television set-top box, or digital video recorder, or any media player), a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating an example apparatus 100 for performing acoustic echo control according to an embodiment of the invention.

As illustrated in FIG. 1, the apparatus 100 includes a first doubletalk detector 101, a second doubletalk detector 102, a controller 103 and an echo processing unit 104.

In an example scenario where the apparatus 100 may be deployed, a loudspeaker outputs sounds according to a loudspeaker signal received through a communication link or reproduced from a local source, and the sounds may be captured through a microphone to produce a microphone signal. In this scenario, the microphone signal may include an echo of the loudspeaker signal. The apparatus 100 is adapted to perform acoustic echo control to cance or suppress the echo in the microphone signal. Therefore, the loudspeaker signal is also called a reference.

The echo processing unit 104 is configured to perform adaption of an adaptive filter (not illustrated in FIG. 1) for applying acoustic echo cancellation or acoustic echo suppression on the microphone signal. The adaption of the adaptive filter means estimating the echo path response and updating coefficients of the adaptive filter to follow the change of the echo path based on the estimate.

In general, doubletalk detection is performed in the acoustic echo control to disable adaption of the adaptive filter, so as to keep the adaptive filter from diverging in the presence of doubletalk. In the apparatus 100, the first doubletalk detector 101 is configured to perform an echo energy-based doubletalk detection to determine whether there is a doubletalk in the microphone signal with reference to the loudspeaker signal.

Various approaches may be used for doubletalk detection based on echo energy in the microphone signal. A general procedure is that a detection statistic, 11, can be formulated from the excitation, desired and/or error signals. Then this detection statistic is compared to a threshold, to determine if doubletalk can be declared. Let x(n), y(n) and d(n) represent the far-end (loudspeaker), near-end(microphone) and estimated echo signals respectively.

One of the approaches is to compare an estimated residual echo power to the actual error power for frame n, denoted as Re(n) and Ra(n), respectively. Doubletalk can be declared if $$\eta = Ra(n)/Re(n) > C \quad (1)$$

where C is a predefined constant, that is to say, if the actual residual error is larger than C times the estimated residual echo power.

The Geigel detector is another representative approach. The detection statistic $\eta$ is the ratio of the far-end to near-end signal levels.

$$\eta = \max\{|x(n)|, \ldots, |x(n-N)|\}/|y(n)| \quad (2)$$

If the maximum far-end signal over an interval of length N (typically the length of the echo path) is less than the near-end signal by a threshold, then doubletalk can be declared. The threshold for this detection is usually set to a value close to the echo return loss (ERL) of the echo path. Therefore, if the near-end talker is active, then the near-end signal level will increase enough to lower $\eta$ below the threshold.

Besides the above-mentioned two, double talk detection based on cross-correlation is also commonly used. Closed-loop and open-loop analysis are the two main correlation based methods. In the closed-loop analysis, the cross-correlation is between the microphone signal and the estimated echo signal.

$$\eta = \frac{\left|\sum x(n-k-N)y(n-k)\right|}{\sum |x(n-k-N)y(n-k)|} \quad (3)$$

In the open-loop analysis, the cross-correlation is between microphone and the maximally correlated excitation signal.

$$\eta = \max_N \frac{\left|\sum x(n-k-N)y(n-k)\right|}{\sum |x(n-k-N)y(n-k)|} \quad (4)$$

The second doubletalk detector 102 is configured to calculate a spectral similarity between spectra of the microphone signal and the loudspeaker signal, and determine that there is no doubletalk in the microphone signal if the spectral similarity is higher than a threshold level $TH_d$. If otherwise, it is determined that there is doubletalk in the microphone signal.

Doubletalk detection using spectral similarity is based on the following observations. If there is a certain level of common characteristics between the spectra of the echo reference and the incoming microphone signal, it is reasonable to assume that there is a certain amount of commonality in the signals, and thus there is a likelihood that echo presents in the microphone signal, and exceeds the energy of other local voice or interfering noises. The spectral similarity is designed to measure such commonality. If the spectral similarity is high to a certain extent, it is determined that no doubletalk presents in the microphone signal.

The spectra of the microphone signal and the loudspeaker signal may be amplitude spectra, phase spectra, power spectra or other spectra which can be derived through frequency analysis, as long as the spectra can reflect the difference between different signals. In general, the spectra may include signal magnitudes on multiple bands or frequency bins, and may be represented as data sequences. Any metric for measuring similarity between data sequences may be adopted for the spectral similarity between the spectra of the microphone signal and the loudspeaker signal.

The threshold level $TH_d$ may be predetermined based on a tradeoff between requirements on the sensitivity and the robustness of the doubletalk detection, or may be tuned for specific applications.

The controller 103 is configured to enable the adaption of the adaptive filter if the first doubletalk detector 101 determines that there is no doubletalk in the microphone signal, or the second doubletalk detector 102 determines that there is no doubletalk in the microphone signal. If the first doubletalk detector 101 and the second doubletalk detector 102 both determine that there is doubletalk in the microphone signal, the adaption of the adaptive filter is disabled.

In the doubletalk detection performed by the first doubletalk detector 101, if the current echo path estimate is incorrect, a false doubletalk may be detected due to the slow convergence of the adaptive filter to the current echo path. Specifically, if the echo path experiences a sudden increase in amplitude and the current echo path estimate fails to follow this increase, significant portion of the echo energy in the microphone signal is not identified as that of the echo, and therefore, is interpreted as an interfering or local signal activity. For instance, if the amplitude of the echo path suddenly increases, resulting in the actual error power Ra(n) much larger than C times the estimated residual echo power Re(n), i.e., Ra(n)/Re(n)>C. According to (1), false doubletalk is declared. If the adaption of the adaptive filter is disabled upon this false doubletalk, the adaption is undesirably slowed down or suspended, and the AEC or AES system may retain an incorrect estimate of the echo path, causing system performance degradation and/or the presence of a high level of undesirable residual echo.

In case of the above-mentioned sudden increase in amplitude of the echo path, the microphone signal and the loudspeaker signal can have a similar spectrum, because the microphone signal mainly includes the echo of the loudspeaker signal, if there is no local talk. Therefore, by performing another doubletalk detection through the second doubletalk detector 102 based on the spectral similarity and deciding a final doubletalk only if the first doubletalk detector 101 and the second doubletalk detector both detect a doubletalk, such false doubletalk may be avoided or significantly reduced. Hence, it is possible to reduce the convergence time or recovery from sudden changes in the echo path, or mis-convergence of the echo estimate on initialization or reset. For example, the embodiments of the invention may be used to reduce the need for a separate initialization stage or differing approach to control of the adaptive filter at commencement or onset of echo signal. Another advantage of using spectral similarity lies in the fact that it does not rely on the ratio of the energy of two signals, thus avoiding the determination of the threshold such as the constant C in expression (1). Instead, how similar two spectra are is used as a reference for declaring doubletalk. This makes it useful for cases like abrupt echo path amplitude jumps, where the echo energy based DTD fails. Therefore, the overall idea of combining these two methods stems from that fact that the echo energy based DTD is effective in most cases (for non-abrupt echo path changes) while the spectral similarity based DTD is effective for abrupt echo path changes. The final result obtained by combining both strategies is thus a more robust DTD detector.

Figure 2:
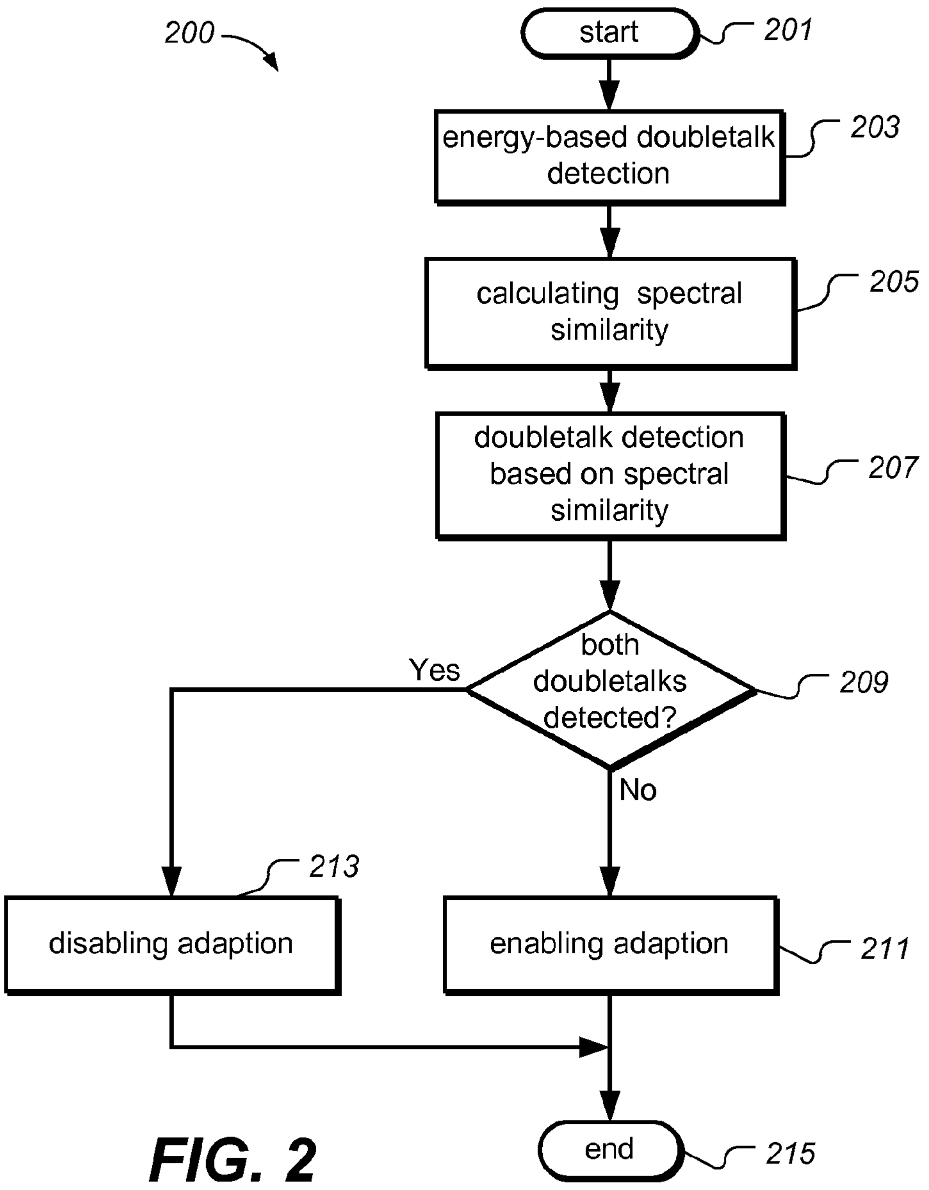
FIG. 2 is a flow chart illustrating an example method of performing acoustic echo control according to an embodiment of the invention.

FIG. 2 is a flow chart illustrating an example method 200 of performing acoustic echo control according to an embodiment of the invention.

As illustrated in FIG. 2, the method 200 starts from step 201. At step 203, an echo energy-based doubletalk detection is performed to determine whether there is a doubletalk in the microphone signal with reference to the loudspeaker signal.

At step 205, a spectral similarity is calculated between spectra of the microphone signal and the loudspeaker signal. At step 207, it is determined that there is no doubletalk in the microphone signal if the spectral similarity is higher than a threshold level $TH_d$. If otherwise, it is determined that there is doubletalk in the microphone signal.

At step 209, it is determined whether doubletalk is detected at both steps 203 and 207. If it is determined that there is no doubletalk in the microphone signal at step 203, or it is determined that there is no doubletalk in the microphone signal at step 207, at step 211, adaption of an adaptive filter for applying acoustic echo cancellation or acoustic echo suppression on the microphone signal is enabled. If doubletalk is detected at both steps 203 and 207, at step 213, the adaption of the adaptive filter is disabled. The method 200 ends at step 215.

Figure 3:
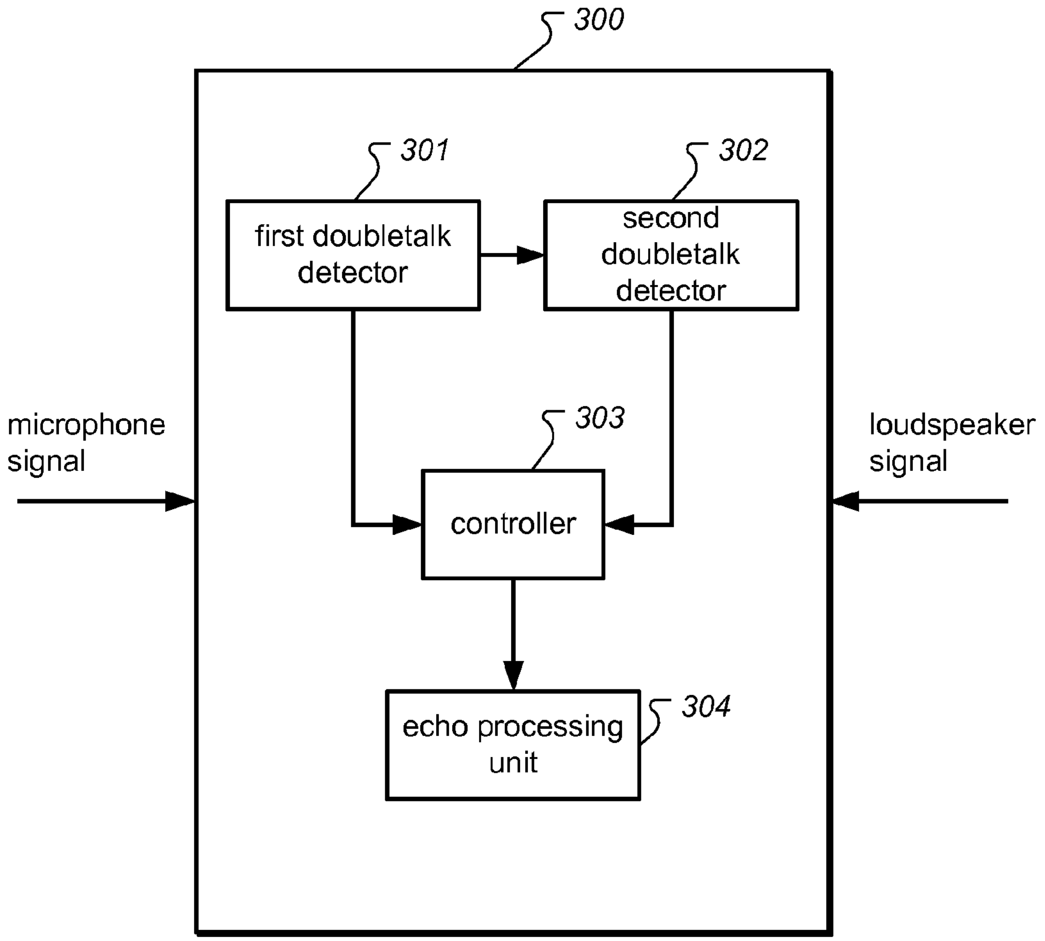
FIG. 3 is a block diagram illustrating an example apparatus for performing acoustic echo control according to an embodiment of the invention.

FIG. 3 is a block diagram illustrating an example apparatus 300 for performing acoustic echo control according to an embodiment of the invention.

As illustrated in FIG. 3, the apparatus 300 includes a first doubletalk detector 301, a second doubletalk detector 302, a controller 303 and an echo processing unit 304.

The first doubletalk detector 301, controller 303 and echo processing unit 304 have the same function as that of the first doubletalk detector 101, controller 103 and echo processing unit 104 respectively, and will not be described in detail hereafter.

The second doubletalk detector 302 is configured to calculate a spectral similarity between spectra of the microphone signal and the loudspeaker signal if the first doubletalk detector 301 has detected the doubletalk. In this case, and accordingly, the second doubletalk detector 302 is configured to determine that there is no doubletalk in the microphone signal if the spectral similarity is higher than a threshold level $TH_d$. If otherwise, it is determined that there is doubletalk in the microphone signal.

Figure 4:
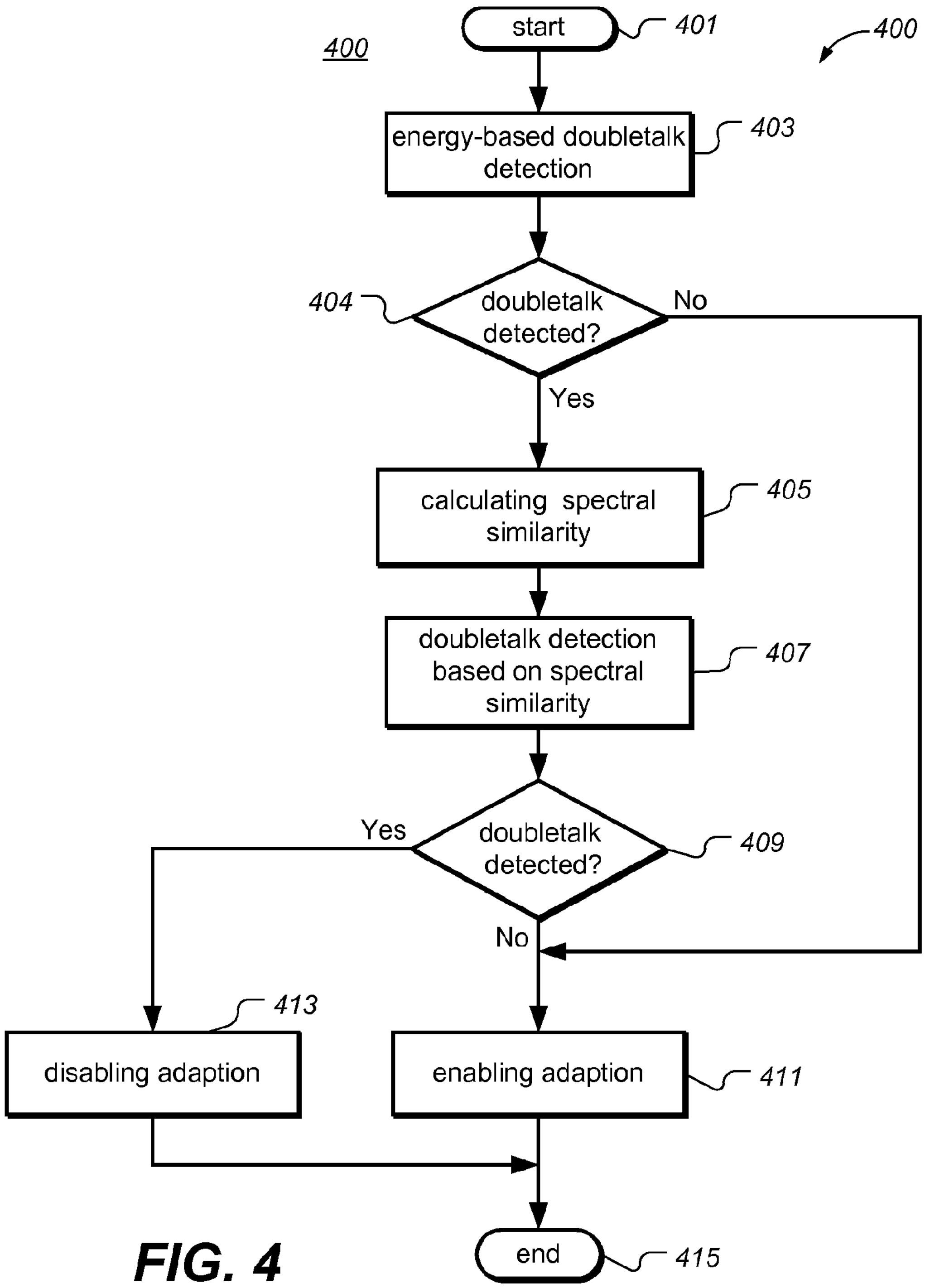
FIG. 4 is a flow chart illustrating an example method of performing acoustic echo control according to an embodiment of the invention.

FIG. 4 is a flow chart illustrating an example method 400 of performing acoustic echo control according to an embodiment of the invention.

As illustrated in FIG. 4, the method 400 starts from step 401. At step 403, an echo energy-based doubletalk detection is performed to determine whether there is a doubletalk in the microphone signal with reference to the loudspeaker signal.

At step 404, it is determined whether the doubletalk is detected in the microphone signal. If yes, the method 400 proceeds to step 405. If no, the method 400 proceeds to step 411.

Steps 405 and 407 have the same function as that of steps 205 and 207, and will not be described in detail hereafter.

At step 409, it is determined whether the doubletalk is detected at step 407. If yes, the method 400 proceeds to step 413. If no, the method 400 proceeds to step 411.

Steps 413 and 411 have the same function as that of steps 213 and 211, and will not be described in detail hereafter. The method 400 ends at step 415.

In further embodiments of the apparatuses 100 and 300, as well as the methods 200 and 400, the spectra of the microphone signal and the loudspeaker signal are smoothed to suppress random disturbance, so as to improve the accuracy of the spectral similarity. In an example, Let X(n) and D(n) be two data sequences containing the spectra of the loudspeaker signal and the microphone signal for frame n, respectively. Smoothed version $X_s(n)$ and $D_s(n)$ of the spectra may be calculated according to the following equations:

$$X_s(n)=X_s(n-1)+\alpha(X(n)-X_s(n-1)),$$

and $$D_s(n)=D_s(n-1)+\alpha(D(n)-D_s(n-1)) \quad (5),$$

where $\alpha$ represents a smoothing factor in the range of [0, 1]. It should be understood that other smoothing algorithms for removing random disturbance may also be adopted.

It is observed that, for two given uncorrelated speech, e.g. far-end speech (reference speech) and near-end speech (local talker), it can be assumed that the locations of the peaks in their respective spectra usually exhibit certain dissimilarity. This assumption is reasonable because speeches are usually sparse in frequency domain. Therefore, it is possible to use the locations of peaks or sorted bin magnitudes to reflect the feature of spectra and use the feature for comparison.

In further embodiments of the apparatuses 100 and 300, as well as the methods 200 and 400, the spectra of the microphone signal and the loudspeaker signal are calculated as spectral vectors including elements representing signal magnitudes on a set of perceptually spaced bands, or on a set of frequency bins of the corresponding signal. Accordingly, the spectral similarity is calculated as a similarity between the spectral vectors. In this way, the magnitudes and the locations of the peaks can be characterized in the vectors. Therefore, various methods for measuring similarity between vectors may be adopted to calculate the spectral similarity.

In further embodiments of the apparatuses 100 and 300, as well as the methods 200 and 400, in case of the spectra are represented as spectral vectors, the spectral vectors may be binarized in calculating the spectra. Specifically, for each element of the spectral vectors, the element is assigned with a first value (e.g., 1) if the signal magnitude represented by the element is relatively high in the corresponding spectrum, and with a second value (e.g., 0) if the signal magnitude represented by the element is relatively low in the corresponding spectrum.

Various criteria for determining which is relatively low or high may be adopted. In an example method, a threshold may be provided. If a signal magnitude is greater than the threshold, it is determined that the signal magnitude is relatively high, and if otherwise, it is determined that the signal magnitude is relatively low. In another example method, it is possible to locate local extrema of signal magnitudes in the spectrum, and determine the located signal magnitudes as relatively high, and other magnitudes in the spectrum as relatively low. In another example method, it is possible to locate a predetermined number PeakNum of largest signal magnitudes in the spectrum, and determine the located signal magnitudes as relatively high, and other magnitudes in the spectrum as relatively low. For example, assuming that PeakNum=3, the number of bands (or frequency bins) BandNum=6, $X_s(n)=[20\ 10\ 5\ 17\ 68\ 30]^T$, and $D_s(n)=[10\ 0\ 30\ 86\ 51\ 64]^T$, the corresponding binarized vectors $I_X$ and $I_D$ are derived as follows:

$$I_X=[1\ 0\ 0\ 0\ 1\ 1]^T \text{ and } I_D=[0\ 0\ 0\ 1\ 1\ 1]^T.$$

In an example, the spectral similarity SIM between binarized vectors $I_X$ and $I_D$ may be calculated as a dot-product with the normalization of the length of the vector (BandNum), i.e., $$SIM=I^T_D I_X/\text{BandNum} \quad (6).$$

Figure 5:
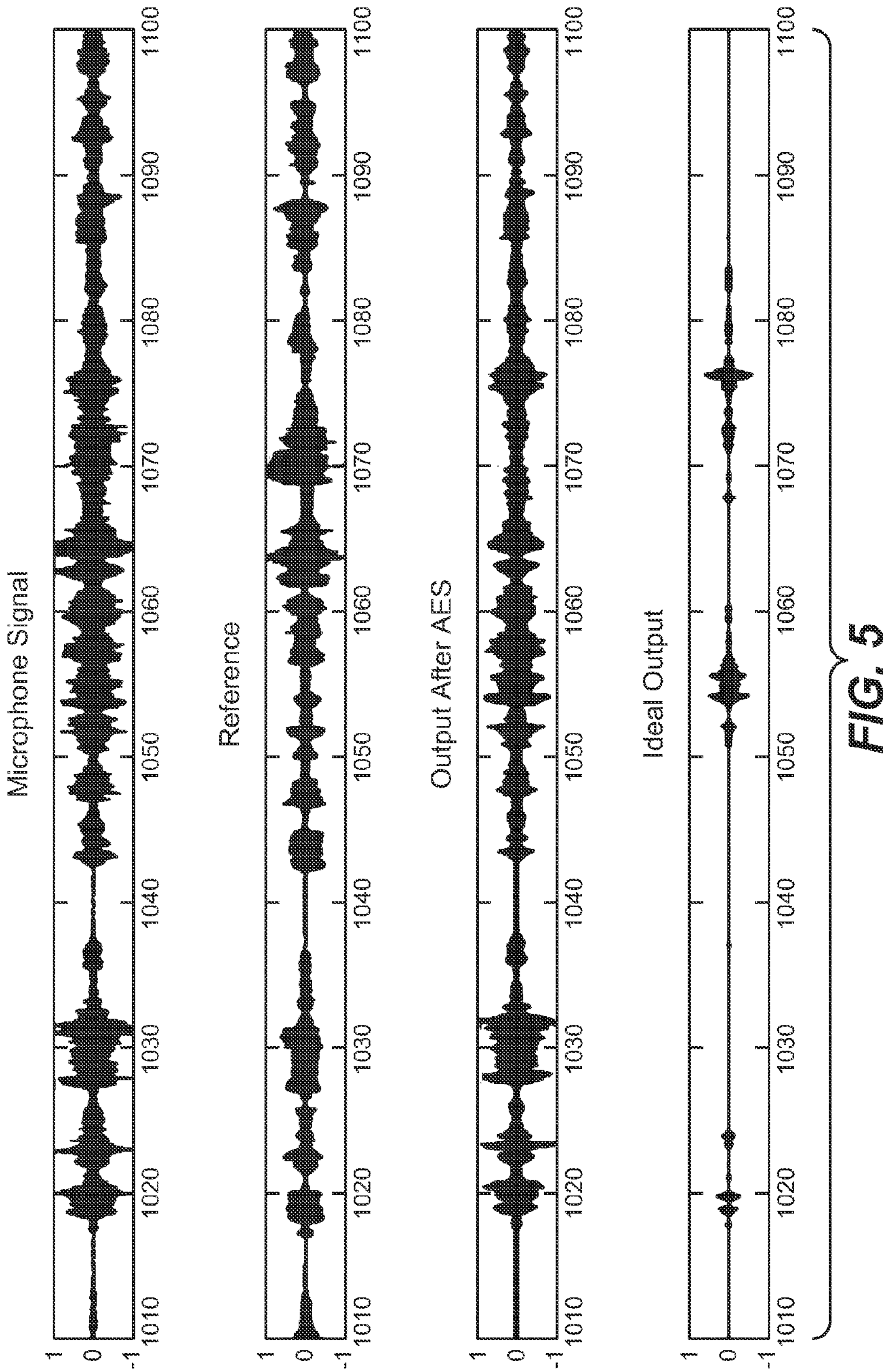
FIG. 5 is a diagram schematically illustrating an output after AES by using the conventional DTD in a conservative manner.

FIG. 5 is a diagram schematically illustrating an output after AES by using the conventional DTD in a conservative manner. From FIG. 5, by comparing the actual output after AES with the ideal output, it can be seen that the adaptive filter fails to converge. The actual output signal contains significant amount of echo speech.

Figure 6:
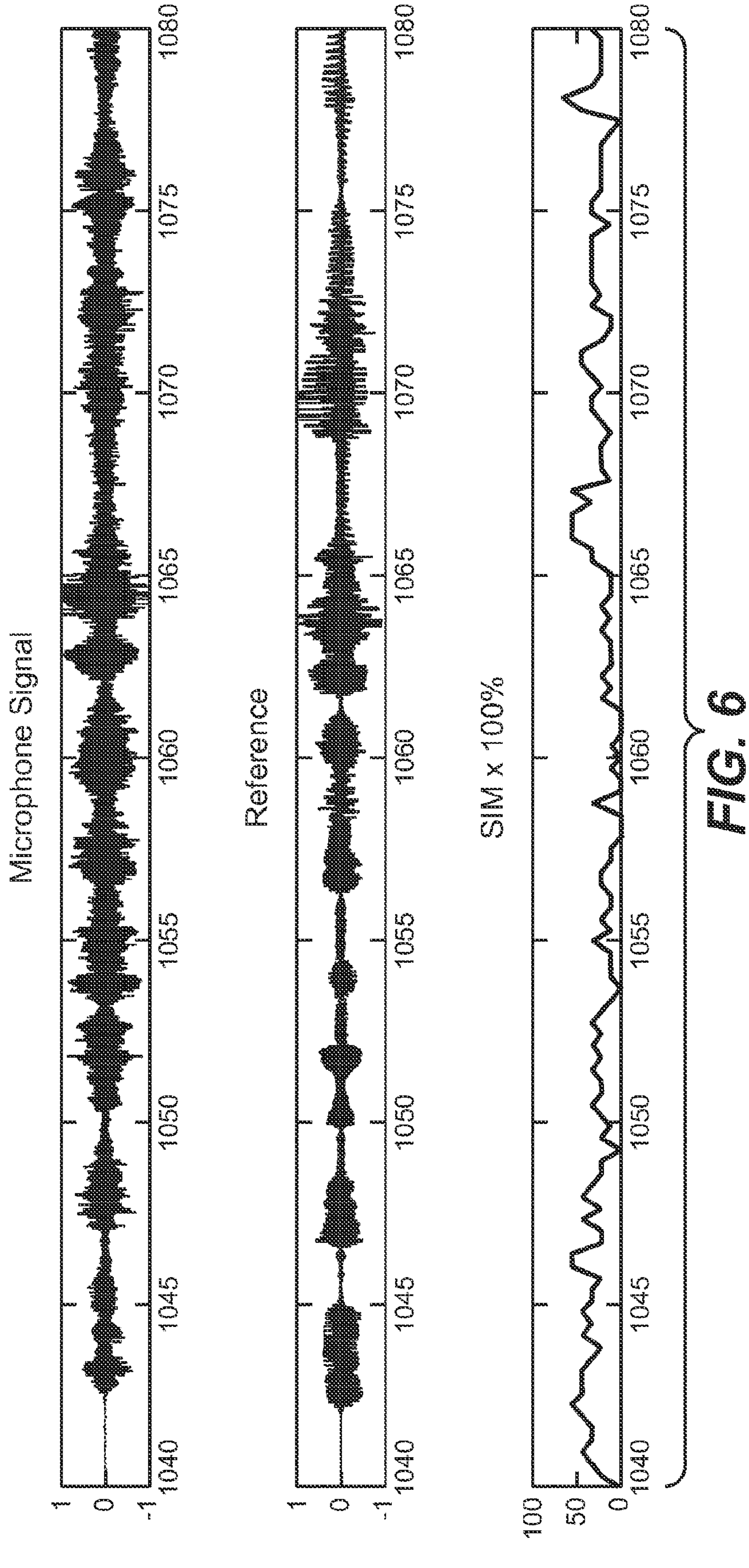
FIG. 6 is a diagram schematically illustrating similarity measurement during doubletalk according to the similarity defined in Equation (6) with BandNum=48, PeakNum=10 and $\alpha$=0.5.

FIG. 6 is a diagram schematically illustrating similarity measurement during doubletalk according to the similarity defined in Equation (6) with BandNum=48, PeakNum=10 and $\alpha$=0.5. From FIG. 6, it can be seen that the value SIM is below 50% most of the time.

Figure 7:
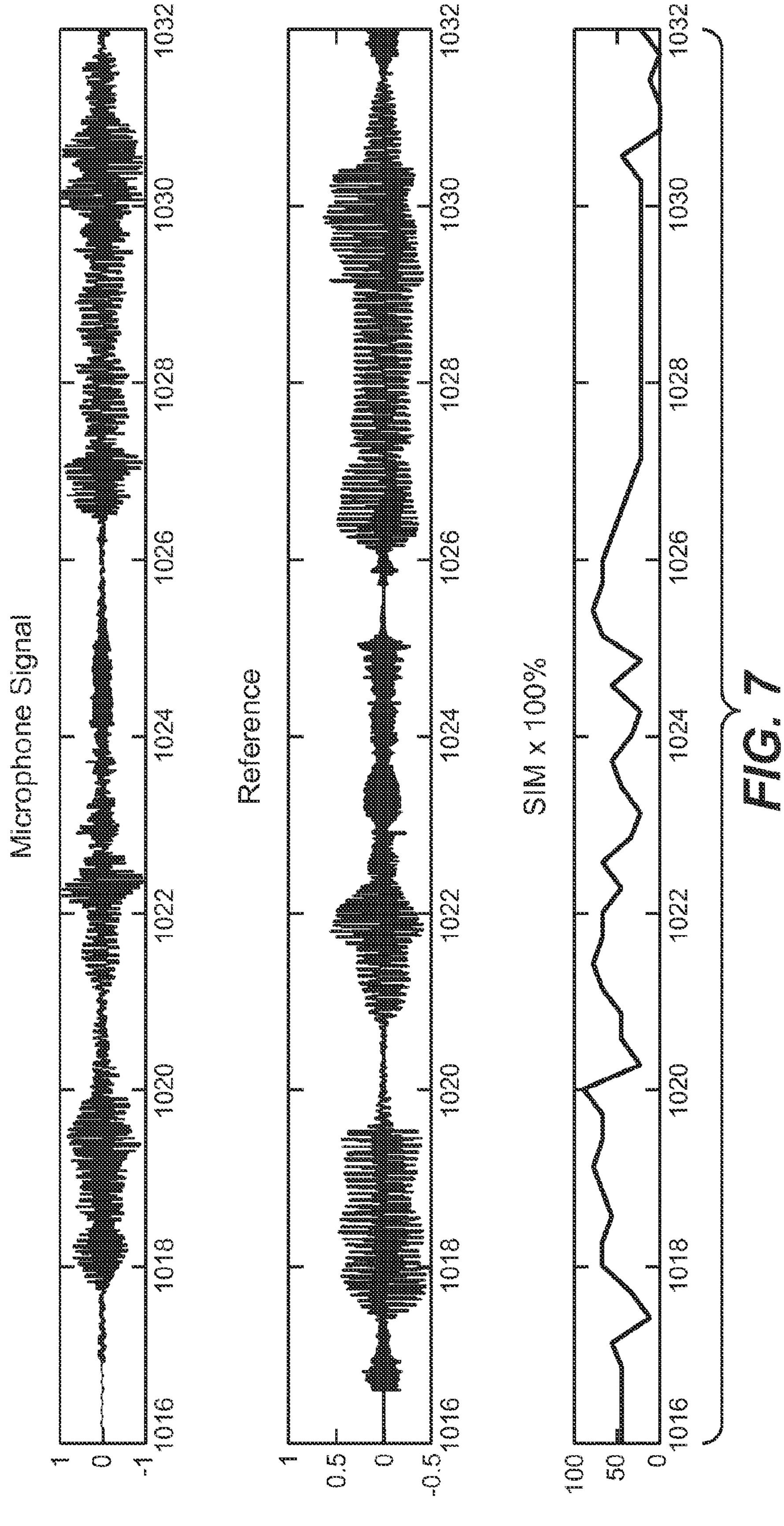
FIG. 7 is a diagram schematically illustrating similarity measurement during echo path change according to the similarity defined in Equation (6) with BandNum=48, PeakNum=10 and $\alpha$=0.5.

FIG. 7 is a diagram schematically illustrating similarity measurement during echo path change according to the similarity defined in Equation (6) with BandNum=48, PeakNum=10 and $\alpha$=0.5. From FIG. 7, it can be seen that the value SIM is much higher than the case in FIG. 6 and is above 50% most of the time.

In further embodiments of the apparatuses 100 and 300, as well as the methods 200 and 400, in case of the spectra are represented as spectral vectors X(n) and D(n), the spectral similarity may be calculated as follows. For each signal magnitude $x_i$ which is relatively high in the spectrum in one of the spectra, e.g., X(n), a minimum difference $min\_diff_i$ between the index i and all the indices of all the signal magnitudes which are relatively high in the spectrum in another of the spectra, e.g., D(n) is calculated. A sum of all the calculated minimum index differences is calculated to represent a distance between the spectral vectors X(n) and D(n). A further approach is to take a set of peak or extrema indices in each spectrum and find an appropriate pairing of indices in each set such that the closes indices across the sets are paired. Such algorithms are known to those skilled in the art as 'matching algorithms', and calculating a measure of spectral similarity using a more continuous matching function such as this will lead to a calculated similarity that is more robust.

By way of example, considering again the example above, with three peaks selected, the two sets of three indices are [1 5 6] and [4 5 6], the distances between appropriately matched indices are 3+0+0=3. In this case, a lower number indicates higher spectral similarity. As the number of bands or bins increases, this approach of matching the high spectral values or extrema provides a more continuous estimate of spectral similarity than the first suggested embodiment which accumulates the number of indices that are present in both sets.

In further embodiments of the apparatuses 100 and 300, as well as the methods 200 and 400, the spectral similarity may be calculated as follows. The spectra of the microphone signal and the loudspeaker signal are calculated. Then, two coefficient vectors of linear predictive coding (LPC) coefficients are extracted from the spectra respectively. The coefficients in the coefficient vectors are converted to line spectral frequencies. Accordingly, the spectral similarity is calculated based on a distance between the coefficient vectors. In this way, it is possible to measure the similarity by comparing the spectral envelope of the signals.

In further embodiments of the apparatuses 100 and 300, the microphone signal and the loudspeaker signal are coded using a linear predictive coding (LPC) based method such as Code-excited linear prediction (CELP). In this case, the spectral similarity may be calculated as follows. A codebook is searched to find a LPC entry corresponding to LPC coefficients of the loudspeaker signal, and a LPC entry corresponding to LPC coefficients of the microphone signal. A pre-calculated distance between the LPC entries is retrieved from the codebook. The spectral similarity is calculated based on the retrieved distance.

In scenarios where more than one talker is talking, various talker combinations may present in the microphone signal. For example, one combination includes a male talker and a female talker, another combination includes two male talkers or two female talkers. Different combinations may present different spectral characteristics, for example, different magnitude in different frequency regions. It is possible to adopt corresponding algorithms of calculating spectral similarity suitable for different combinations.

In further embodiments of the apparatuses 100 and 300, an identifying unit may be included. The identifying unit is configured to identify the type of talker combination in one of the loudspeaker signal and the microphone signal. The second doubletalk detector is further configured to choose an algorithm configured for the type to calculate the spectral similarity. Further embodiments of the methods 200 and 400, a step of identifying the type of talker combination in one of the loudspeaker signal and the microphone signal is included. The calculation of the spectral similarity includes choosing an algorithm configured for the type to calculate the spectral similarity.

Figure 8:
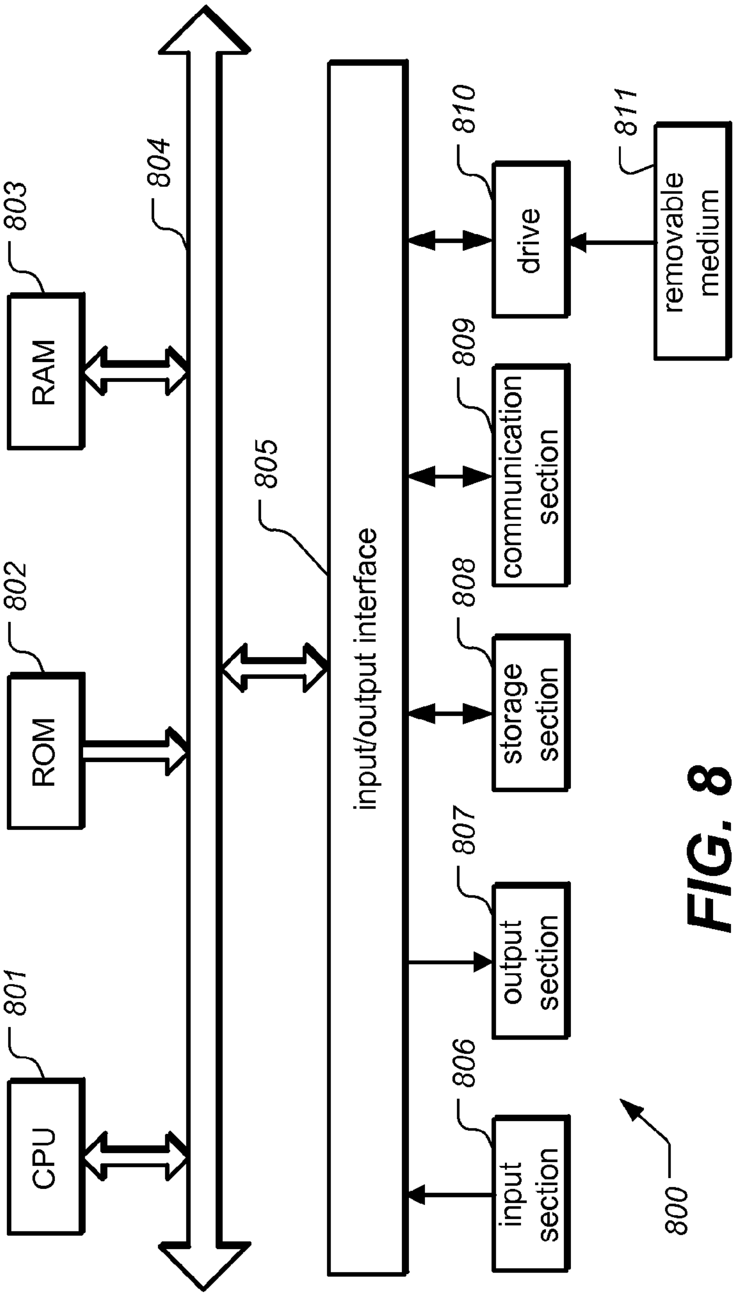
FIG. 8 is a block diagram illustrating an exemplary system for implementing embodiments of the present invention.

FIG. 8 is a block diagram illustrating an exemplary system 800 for implementing embodiments of the present invention.

In FIG. 8, a central processing unit (CPU) 801 performs various processes in accordance with a program stored in a read only memory (ROM) 802 or a program loaded from a storage section 808 to a random access memory (RAM) 803. In the RAM 803, data required when the CPU 801 performs the various processes or the like are also stored as required.

The CPU 801, the ROM 802 and the RAM 803 are connected to one another via a bus 804. An input/output interface 805 is also connected to the bus 804.

The following components are connected to the input/output interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet.

A drive 810 is also connected to the input/output interface 805 as required. A removable medium 811, such as a magnetic disk, an optical disk, a magneto-optical disk, a semiconductor memory, or the like, is mounted on the drive 810 as required, so that a computer program read therefrom is installed into the storage section 808 as required.

In the case where the above-described steps and processes are implemented by the software, the program that constitutes the software is installed from the network such as the internet or the storage medium such as the removable medium 811.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A method of performing acoustic echo control, comprising:

performing an echo energy-based doubletalk detection to determine whether there is a doubletalk in a microphone signal with reference to a loudspeaker signal;

calculating a spectral similarity between spectra of the microphone signal and the loudspeaker signal;

determining that there is no doubletalk in the microphone signal if the spectral similarity is higher than a threshold level; and enabling adaption of an adaptive filter for applying acoustic echo cancellation or acoustic echo suppression on the microphone signal if it is determined that there is no doubletalk in the microphone signal through the echo energy-based doubletalk detection, or there is no doubletalk through the spectral similarity-based doubletalk detection.

EE 2. The method according to EE 1, wherein the spectra are power spectra.

EE 3. The method according to EE 1 or 2, wherein the calculation of the spectra comprises smoothing the spectra to suppress random disturbance.

EE 4. The method according to EE 1 or 2, wherein the calculation of the spectral similarity comprises:

calculating each of the spectra as a spectral vector including elements representing signal magnitudes on a set of perceptually spaced bands, or on a set of frequency bins of the corresponding signal; and calculating the spectral similarity as similarity between the spectral vectors.

EE 5. The method according to EE 4, wherein the calculation of the spectral vector comprises:

for each element of the spectral vector, assigning the element with a first value if the signal magnitude represented by the element is relatively high in the corresponding spectrum, and with a second value if the signal magnitude represented by the element is relatively low in the corresponding spectrum.

EE 6. The method according to EE 5, wherein the calculation of the spectral vector comprises:

locating a predetermined number of largest signal magnitudes or local extrema of signal magnitudes in the spectrum; and determining the located signal magnitudes as relatively high, and other signal magnitudes in the spectrum as relatively low.

EE 7. The method according to EE 4, wherein the elements are the corresponding signal magnitudes, and the calculation of the spectral similarity comprises:

for each signal magnitude in one of the spectra, which is relatively high in the spectrum, calculating a minimum difference between the signal magnitude and all the signal magnitudes in another of the spectra, which are relatively high in the spectrum; and calculating the spectral similarity based on a sum of all the calculated minimum differences.

EE 8. The method according to EE 1 or 2, wherein the calculation of the spectral similarity comprises:

calculating the spectra of the microphone signal and the loudspeaker signal;

extracting two coefficient vectors of linear predictive coding (LPC) coefficients from the spectra respectively;

converting the LPC coefficients in the coefficient vectors to line spectral frequencies; and calculating the spectral similarity based on a distance between the coefficient vectors.

EE 9. The method according to EE 1 or 2, wherein the microphone signal and the loudspeaker signal are coded using a linear predictive coding (LPC) based method, and the calculation of the spectral similarity comprises:

searching the codebook to find a LPC entry corresponding to the LPC coefficients of the loudspeaker signal, and a LPC entry corresponding to LPC coefficients of the microphone signal;

retrieving a pre-calculated distance between the LPC entries from the codebook; and calculating the spectral similarity based on the retrieved distance.

EE 10. The method according to EE 1 or 2, further comprising:

identifying the type of talker combination in one of the loudspeaker signal and the microphone signal; and choosing an algorithm configured for the type to calculate the spectral similarity.

EE 11. The method according to EE 1 or 2, wherein the step of calculating and the step of determining are performed only if it is determined that there is a doubletalk through the echo energy-based doubletalk detection.

EE 12. An apparatus for performing acoustic echo control, comprising:

a first doubletalk detector configured to perform an echo energy-based doubletalk detection to determine whether there is a doubletalk in a microphone signal with reference to a loudspeaker signal;

a second doubletalk detector configured to calculate a spectral similarity between spectra of the microphone signal and the loudspeaker signal, and determine that there is no doubletalk in the microphone signal if the spectral similarity is higher than a threshold level;

an echo processing unit configured to perform adaption of an adaptive filter for applying acoustic echo cancellation or acoustic echo suppression on the microphone signal; and a controller configured to enable the adaption of the adaptive filter if it is determined that there is no doubletalk in the microphone signal through the echo energy-based doubletalk detection, or there is no doubletalk through the spectral similarity-based doubletalk detection.

EE 13. The apparatus according to EE 12, wherein the spectra are power spectra.

EE 14. The apparatus according to EE 12 or 13, wherein the second doubletalk detector is further configured to smooth the spectra to suppress random disturbance.

EE 15. The apparatus according to EE 12 or 13, wherein the second doubletalk detector is further configured to:

calculate each of the spectra as a spectral vector including elements representing signal magnitudes on a set of perceptually spaced bands, or on a set of frequency bins of the corresponding signal; and calculate the spectral similarity as similarity between the spectral vectors.

EE 16. The apparatus according to EE 15, wherein the second doubletalk detector is further configured to:

for each element of the spectral vector, assign the element with a first value if the signal magnitude represented by the element is relatively high in the corresponding spectrum, and with a second value if the signal magnitude represented by the element is relatively low in the corresponding spectrum.

EE 17. The apparatus according to EE 16, wherein the second doubletalk detector is further configured to:

locate a predetermined number of largest signal magnitudes or local extrema of signal magnitudes in the spectrum; and determine the located signal magnitudes as relatively high, and other signal magnitudes in the spectrum as relatively low.

EE 18. The apparatus according to EE 15, wherein the elements are the corresponding signal magnitudes, and the second doubletalk detector is further configured to:

for each signal magnitude in one of the spectra, which is relatively high in the spectrum, calculate a minimum difference between the signal magnitude and all the signal magnitudes in another of the spectra, which are relatively high in the spectrum; and calculate the spectral similarity based on a sum of all the calculated minimum differences.

EE 19. The apparatus according to EE 12 or 13, wherein the second doubletalk detector is further configured to:

calculate the spectra of the microphone signal and the loudspeaker signal;

extract two coefficient vectors of linear predictive coding (LPC) coefficients from the spectra respectively;

convert the LPC coefficients in the coefficient vectors to line spectral frequencies; and calculate the spectral similarity based on a distance between the coefficient vectors.

EE 20. The apparatus according to EE 12 or 13, wherein the microphone signal and the loudspeaker signal are coded using a linear predictive coding (LPC) based method, and the second doubletalk detector is further configured to:

search the codebook to find a LPC entry corresponding to the LPC coefficients of the loudspeaker signal, and a LPC entry corresponding to LPC coefficients of the microphone signal;

retrieve a pre-calculated distance between the LPC entries from the codebook; and calculate the spectral similarity based on the retrieved distance.

EE 21. The apparatus according to EE 12 or 13, further comprising:

an identifying unit configured to identify the type of talker combination in one of the loudspeaker signal and the microphone signal, and the second doubletalk detector is further configured to choose an algorithm configured for the type to calculate the spectral similarity.

EE 22. The apparatus according to EE 12 or 13, wherein the second doubletalk detector is further configured to perform the calculating and the determining only if the first doubletalk detector determines that there is a doubletalk.

EE 23. A computer-readable medium having computer program instructions recorded thereon, when being executed by a processor, the instructions enabling the processor to execute a method of performing acoustic echo control, comprising:

performing an echo energy-based doubletalk detection to determine whether there is a doubletalk in a microphone signal with reference to a loudspeaker signal;

calculating a spectral similarity between spectra of the microphone signal and the loudspeaker signal;

determining that there is no doubletalk in the microphone signal if the spectral similarity is higher than a threshold level; and enabling adaption of an adaptive filter for applying acoustic echo cancellation or acoustic echo suppression on the microphone signal if it is determined that there is no doubletalk in the microphone signal through the echo energy-based doubletalk detection, or there is no doubletalk through the spectral similarity-based doubletalk detection.

The invention claimed is:

1. A method of performing acoustic echo control, comprising:

performing an echo energy-based doubletalk detection to determine whether there is a doubletalk in a microphone signal with reference to a loudspeaker signal;

calculating a spectral similarity between spectra of the microphone signal and the loudspeaker signal;

determining that there is no doubletalk in the microphone signal if the spectral similarity is higher than a threshold level; and enabling adaption of an adaptive filter for applying acoustic echo cancellation or acoustic echo suppression on the microphone signal if it is determined that there is no doubletalk in the microphone signal through the echo energy-based doubletalk detection, or there is no doubletalk through the spectral similarity-based doubletalk detection, wherein the calculation of the spectral similarity comprises:

calculating each of the spectra as a spectral vector including elements representing signal magnitudes on a set of perceptually spaced bands, or on a set of frequency bins of the corresponding signal; and calculating the spectral similarity as similarity between the spectral vectors, wherein the step of calculating and the step of determining are performed only if it is determined that there is a doubletalk through the echo energy-based doubletalk detection.

2. The method according to claim 1, wherein the calculation of the spectral vector comprises:

locating a predetermined number of largest signal magnitudes or local extrema of signal magnitudes in the spectrum; and determining the located signal magnitudes as relatively high, and other signal magnitudes in the spectrum as relatively low.

3. The method according to claim 1, wherein the elements are the corresponding signal magnitudes, and the calculation of the spectral similarity comprises:

for each signal magnitude in one of the spectra, which is relatively high in the spectrum, calculating a minimum difference between the signal magnitude and all the signal magnitudes in another of the spectra, which are relatively high in the spectrum; and calculating the spectral similarity based on a sum of all the calculated minimum differences.

4. The method according to claim 1, wherein the calculation of the spectral similarity comprises:

calculating the spectra of the microphone signal and the loudspeaker signal;

extracting two coefficient vectors of linear predictive coding (LPC) coefficients from the spectra respectively;

converting the LPC coefficients in the coefficient vectors to line spectral frequencies; and calculating the spectral similarity based on a distance between the coefficient vectors.

5. An apparatus for performing acoustic echo control, comprising:

a first doubletalk detector configured to perform an echo energy-based doubletalk detection to determine whether there is a doubletalk in a microphone signal with reference to a loudspeaker signal;

a second doubletalk detector configured to calculate a spectral similarity between spectra of the microphone signal and the loudspeaker signal, and determine that there is no doubletalk in the microphone signal if the spectral similarity is higher than a threshold level;

an echo processing unit configured to perform adaption of an adaptive filter for applying acoustic echo cancellation or acoustic echo suppression on the microphone signal; and a controller configured to enable the adaption of the adaptive filter if it is determined that there is no doubletalk in the microphone signal through the echo energy-based doubletalk detection, or there is no doubletalk through the spectral similarity-based doubletalk detection, wherein the second doubletalk detector is further configured to:

calculate each of the spectra as a spectral vector including elements representing signal magnitudes on a set of perceptually spaced bands, or on a set of frequency bins of the corresponding signal; and calculate the spectral similarity as similarity between the spectral vectors, wherein the second doubletalk detector is further configured to:

for each element of the spectral vector, assign the element with a first value if the signal magnitude represented by the element is relatively high in the corresponding spectrum, and with a second value if the signal magnitude represented by the element is relatively low in the corresponding spectrum.

6. The apparatus according to claim 5, wherein the second doubletalk detector is further configured to:

locate a predetermined number of largest signal magnitudes or local extrema of signal magnitudes in the spectrum; and determine the located signal magnitudes as relatively high, and other signal magnitudes in the spectrum as relatively low.

7. The apparatus according to claim 5, wherein the elements are the corresponding signal magnitudes, and the second doubletalk detector is further configured to:

for each signal magnitude in one of the spectra, which is relatively high in the spectrum, calculate a minimum difference between the signal magnitude and all the signal magnitudes in another of the spectra, which are relatively high in the spectrum; and calculate the spectral similarity based on a sum of all the calculated minimum differences.

8. An apparatus for performing acoustic echo control, comprising:

a first doubletalk detector configured to perform an echo energy-based doubletalk detection to determine whether there is a doubletalk in a microphone signal with reference to a loudspeaker signal;

a second doubletalk detector configured to calculate a spectral similarity between spectra of the microphone signal and the loudspeaker signal, and determine that there is no doubletalk in the microphone signal if the spectral similarity is higher than a threshold level;

an echo processing unit configured to perform adaption of an adaptive filter for applying acoustic echo cancellation or acoustic echo suppression on the microphone signal; and a controller configured to enable the adaption of the adaptive filter if it is determined that there is no doubletalk in the microphone signal through the echo energy-based doubletalk detection, or there is no doubletalk through the spectral similarity-based doubletalk detection, wherein the second doubletalk detector is further configured to perform the calculating and the determining only if the first doubletalk detector determines that there is a doubletalk.

* * * * *